(12) United States Patent
Luisi et al.

(10) Patent No.: US 8,494,237 B2
(45) Date of Patent: Jul. 23, 2013

(54) METHOD AND APPARATUS FOR PROCESSING DIGITAL IMAGE REPRESENTATIONS OF A HEAD SHAPE

(75) Inventors: Jerold N. Luisi, Phoenix, AZ (US); Timothy R. Littlefield, Phoenix, AZ (US); George E. Kechter, Peoria, IL (US); Jeanne K. Pomatto-Hertz, Scottsdale, AZ (US)

(73) Assignee: Cranial Technologies, Inc, Tempe, AZ (US)

( * ) Notice: Subject to any disclaimer, the term of this patent is extended or adjusted under 35 U.S.C. 154(b) by 318 days.

(21) Appl. No.: 12/927,128

(22) Filed: Nov. 8, 2010

(65) Prior Publication Data

US 2012/0114201 A1    May 10, 2012

(51) Int. Cl.
*G06K 9/00* (2006.01)
*A61F 5/00* (2006.01)

(52) U.S. Cl.
USPC ............................. 382/128; 382/154; 602/17

(58) Field of Classification Search
USPC .............. 382/100, 128–132, 154; 602/17–18; 128/922; 345/419–420; 600/587; 700/118
See application file for complete search history.

(56) References Cited

U.S. PATENT DOCUMENTS

| 6,501,848 | B1 * | 12/2002 | Carroll et al. ................. 382/128 |
| 7,127,101 | B2 * | 10/2006 | Littlefield et al. ............. 382/154 |
| 7,142,701 | B2 | 11/2006 | Littlefield et al. |
| 7,162,075 | B2 | 1/2007 | Littlefield et al. |
| 7,177,461 | B2 | 2/2007 | Littlefield et al. |
| 7,227,979 | B2 | 6/2007 | Littlefield et al. |
| 7,242,798 | B2 | 7/2007 | Littlefield et al. |
| 7,245,743 | B2 | 7/2007 | Littlefield et al. |
| 7,280,682 | B2 | 10/2007 | Littlefield et al. |
| 7,305,369 | B2 | 12/2007 | Littlefield et al. |
| 7,542,950 | B2 | 6/2009 | Littlefield et al. |
| 7,702,380 | B1 * | 4/2010 | Dean ............................. 600/426 |
| 7,747,305 | B2 * | 6/2010 | Dean et al. .................... 600/407 |
| 2004/0228519 | A1 * | 11/2004 | Littlefield et al. ............. 382/154 |
| 2006/0013505 | A1 * | 1/2006 | Yau et al. ...................... 382/285 |
| 2007/0031041 | A1 * | 2/2007 | Ko et al. ....................... 382/190 |
| 2007/0080967 | A1 * | 4/2007 | Miller ........................... 345/473 |
| 2007/0201750 | A1 * | 8/2007 | Ito et al. ....................... 382/228 |
| 2008/0052312 | A1 * | 2/2008 | Tang et al. ................. 707/104.1 |
| 2008/0082468 | A1 * | 4/2008 | Long et al. ..................... 706/12 |
| 2010/0135584 | A1 * | 6/2010 | Tang et al. .................... 382/218 |
| 2010/0189313 | A1 * | 7/2010 | Prokoski ....................... 382/118 |
| 2011/0054303 | A1 * | 3/2011 | Barrick et al. ................ 600/424 |
| 2012/0113116 | A1 * | 5/2012 | Luisi et al. .................... 345/420 |
| 2012/0114201 | A1 * | 5/2012 | Luisi et al. .................... 382/128 |
| 2012/0230566 | A1 * | 9/2012 | Dean et al. .................... 382/131 |

* cited by examiner

*Primary Examiner* — Shefali Goradia
(74) *Attorney, Agent, or Firm* — Donald J Lenkszus

(57) ABSTRACT

A method for processing digital image representations representative of a subject head shape comprises: providing a database library of a first plurality of first digital image representations of subject head shapes captured directly from corresponding subjects, and a second plurality of second digital image representations of corresponding modified head shapes. The method includes proving a support vector machine and utilizing the database library plurality of said first and second digital image representation to train the support vector machine to operate on new digital image representations. The method further includes receiving a new digital image representation of a subject head shape captured directly from a new subject; and operating the support vector machine such that the support vector machine operates on the new first digital image representation to generate a corresponding new second digital image representation that replicates a corresponding modified head shape.

22 Claims, 16 Drawing Sheets

United States Patent

METHOD AND APPARATUS FOR PROCESSING DIGITAL IMAGE REPRESENTATIONS OF A HEAD SHAPE

FIELD OF THE INVENTION

This invention pertains to a system and method operating on data representative of three-dimensional shapes, in general, and a system and method operating on data representative of three-dimensional head shapes, in particular.

BACKGROUND OF THE INVENTION

Cranial remodeling is utilized to correct for deformities in the head shapes of infants. Prior to the development of the Dynamic Orthotic Cranioplasty$^{SM}$ method of cranial remodeling by Cranial Technologies, Inc, the assignee of the present invention, the only viable approach for correction of cranial deformities was surgical correction of the shape of the cranium. Dynamic Orthotic Cranioplasty$^{SM}$ utilizes a treatment protocol in which the DOC BAND® cranial remodeling device is custom produced for each subject to be treated.

In the past, custom cranial remodeling devices were produced by first obtaining a full size and accurate cast of the actual head shape of each subject. This cast was then modified to produce a second or desired head shape model. The second or desired head shape model is used to form the cranial remodeling band for the infant. In the past, the second or desired shaped head shape model was obtained by manually modifying the first cast to form the desired shape model.

Cranial Technologies has maintained a "library" of the casts of the head casts of infant's deformed heads and the corresponding models of the desired corrected head shapes.

Cranial Technologies, Inc. continued its pioneering developments with its proprietary DSI® digital image capturing system and its Digital Surface Imaging® methodology for the time efficient and safe image capture of three-dimensional full head images.

More specifically, the DSI® digital image capturing system was utilized to capture DSI® digital data representative of digital images of each cast of a deformed head and each corresponding model of the corrected head shape and store the DSI® digital data for each digital image in first and second databases, respectively. The first and second databases were utilized to train a neural network.

Cranial Technologies developed a system that utilized these first and second databases to automatically produces digital data representative of a modified head shape from DSI® digital data representative of a deformed head. A processor operable with a neural network program trains the neural network program with the first plurality of first sets of captured data stored in the first database and the second plurality of second sets of captured data stored in the second database such that the neural network is trained to operate on a new set of captured data for a first head shape to produce a corresponding modified head shape. In that system, a support vector machine program is operated to train the neural network program.

In the Cranial Technologies system, captured data for a deformed head is processed utilizing Principal Component Analysis (PCA) to generate PCA data representative of the deformed head. The PCA data is provided as input to the neural network. The neural network processes the PCA data to provide data representative of a corresponding modified head shape.

The system developed by Cranial Technologies required the use of trained operators to manipulate the captured data for a variety of reasons. Clinical adaptations to accommodate individual subjects and circumstances result in inconsistent orientations of the subject DSI® captured data files.

The trained operators view each DSI® captured data file of each subject and manually reorient the viewed image to a predetermined orientation. After manual reorientation, the operator manually selects the portion of the DSI® image data files for further use, thereby eliminating regions that will not be utilized.

To achieve improved production efficiency and to maintain high quality results, an automated system and method that is operator independent or substantially operator independent is desired.

It is further desirable that a system and method are provided that will directly capture an image of a subject directly and process the directly captured image.

SUMMARY

In accordance with the principles of the invention, an improved method and system are provided for the processing of digital three-dimensional captured image representations of a subject. The improved method and system is an automated method and system that, in one embodiment is substantially operator independent and in another embodiment is operator dependent. The method and system orients each digital three-dimensional image captured file such that the resulting file has the image of the subject oriented in accordance with a predetermined orientation. The method and system selectively crops or cuts each three-dimensional image captured file such that the resulting file is limited to only a predetermined portion of the subject.

In an embodiment, the system operates on each new captured digital image representation or DSI® mesh of a subject to orient the new digital image representation consistent with digital image representations stored in a library database. After orienting, the system cuts or crops the DSI® mesh to obtain a corresponding cranial digital image representation or mesh.

The system operates on each final digital image representation or DSI® mesh to produce a modified digital image representation or DSI® mesh for the corresponding subject.

In an embodiment, a method for processing representative three-dimensional digital mesh representations captured from a live three-dimensional subject is provided.

In an embodiment of the invention, a method for processing digital image representations representative of a subject head shape comprises: providing a database library of a first plurality of first digital image representations of subject head shapes captured directly from corresponding subjects, and a second plurality of second digital image representations of corresponding modified head shapes. The method includes proving a support vector machine and utilizing the database library plurality of said first and second digital image representation to train the support vector machine to operate on new digital image representations. The method further includes receiving a new digital image representation of a subject head shape captured directly from a new subject; and operating the support vector machine such that the support vector machine operates on the new first digital image representation to generate a corresponding new second digital image representation that replicates a corresponding modified head shape.

An updated database library is produced by storing each new first digital image representation in the database library and each corresponding new second digital image representation is stored in the database library with the second plurality of second digital image representations. The updated database library is used to retrain the support vector machine.

BRIEF DESCRIPTION OF THE DRAWING

The invention will be better understood from a reading of the following detailed description taken in conjunction with the drawing figures in which like designations are utilized to identify like elements, and in which.

DETAILED DESCRIPTION

A library of hundreds of infant head casts and corresponding modified models has been maintained at the assignee of the present invention and this library of actual head casts and the corresponding modified models is believed to be a unique resource. It is this unique resource that was utilized to provide databases for developing the method and apparatus of the prior system.

Cranial Technologies, Inc. developed an image capture technology that has successfully replaced the traditional casting process. This technology referred to as the DSI® technology captures a 360-degree global image capture DSI® and provides improved surface detail over larger regions of the patient than achieved through casting.

Cranial Technologies utilized the DSI® system to capture three-dimensional images of plaster casts of patients' heads to develop a database that in turn was utilized to train a support vector machine.

Applicant recognized that the improved initial digital data record provided by the DSI® system presents an opportunity to provide an improved database, method and system in which three-dimensional digital image data captured directly from live subjects may be used to develop a new database and an improved system and methodology. Applicant has developed a new database, a new system, and new methodologies described herein that operate directly from image data captured directly from live subjects.

The DSI® system generates an image data file that is a digital mesh that represents the captured 360-degree global image. This image referred to as a DSI® mesh may be viewed on a monitor. In the past each DSI® mesh was manipulated by an operator.

In developing the database, system, and method of the invention, DSI® image data files captured directly from approximately 3,000 live subjects were utilized. These unaltered files, i.e., files that were neither oriented nor cropped, were selected to be representative files.

The DSI® image data files captured directly from subjects were utilized to construct a database utilized as described hereinafter.

U.S. Pat. Nos. 7,127,101 issued Oct. 24, 2006; 7,142,701 issued Nov. 28, 2006; 7,162,075 issued Jan. 9, 2007; 7,177,461 issued Feb. 13, 2007; 7,227,979 issued Jun. 5, 2007; 7,242,798 issued Jul. 10, 2007; 7,245,743 issued Jul. 17, 2007; 7,280,682 issued Oct. 9, 2007; and 7,305,369 issued Dec. 4, 2007 are all assigned to the assignee of the present application and the disclosures contained in each of the patents are expressly incorporated herein by reference.

U.S. patent application Ser. No. 12/383,198 filed Mar. 20, 2009 and published as Publication No. 2010/0239135A1 on Sep. 23, 2010; and Ser. No. 12/798,076 filed Mar. 29, 2010 and published as Publication No. 2010/0238273A1 published on Sep. 23, 2010 are all assigned to the assignee of the present application and the disclosures contained in each of the applications as published are expressly incorporated herein by reference.

Figure 1:
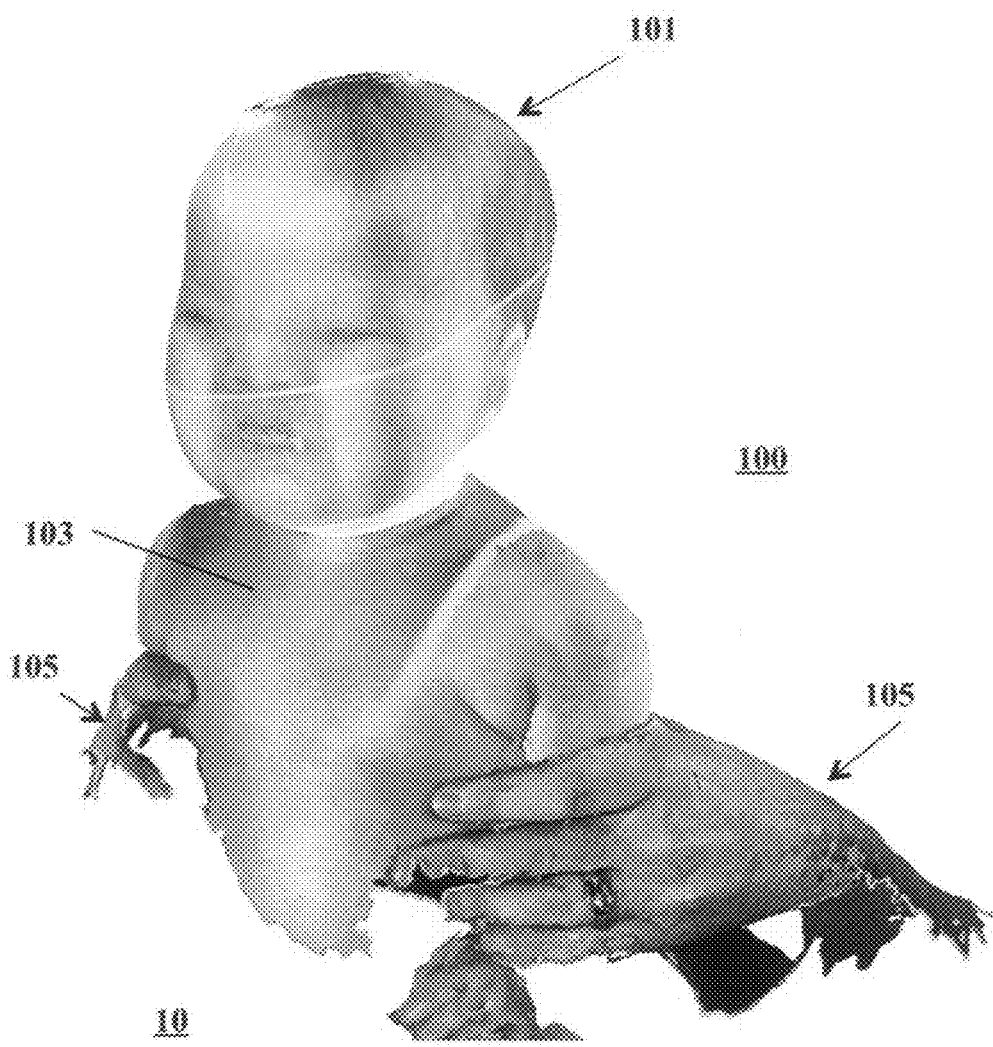
FIG. 1 illustrates a representative three-dimensional image with photographic overlay of a subject.
Figure 2:
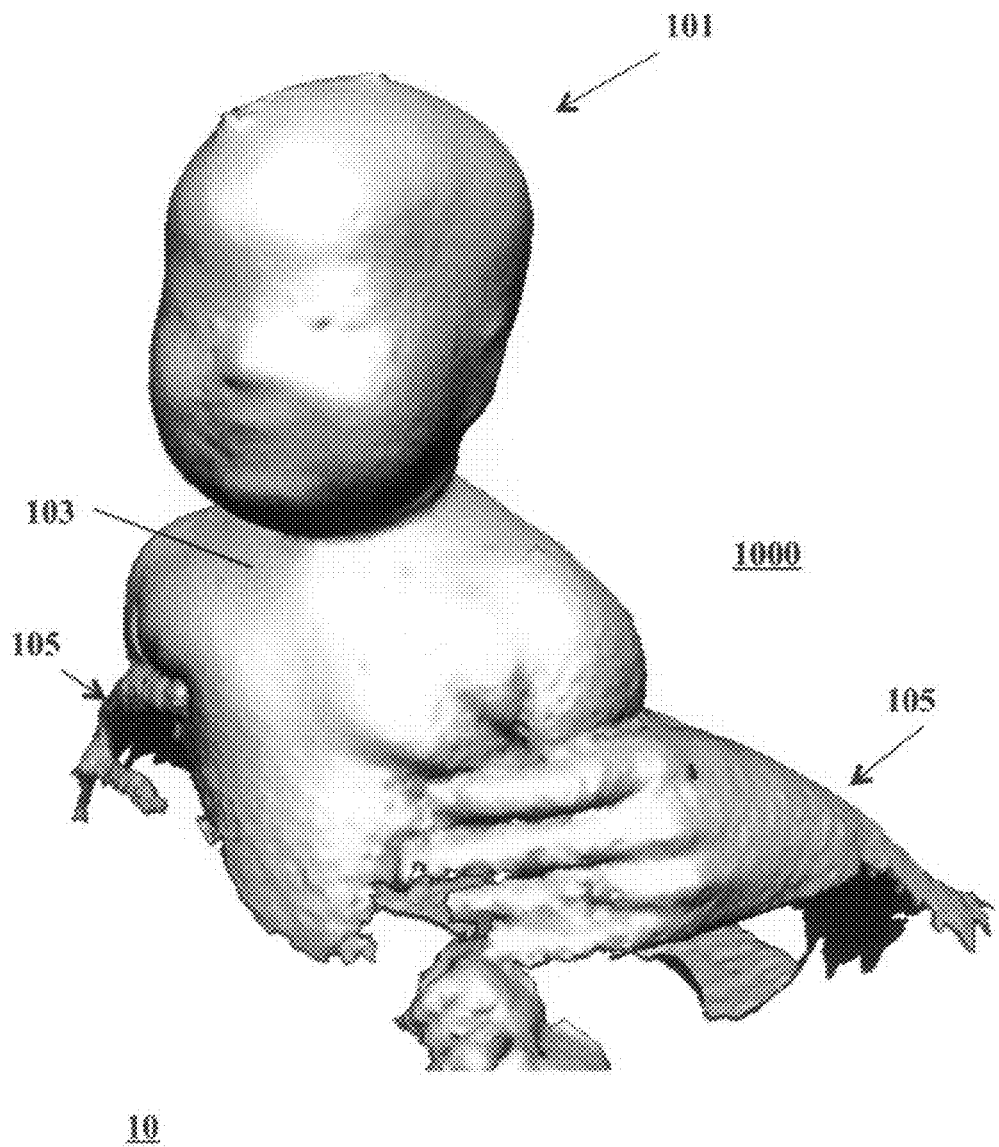
FIG. 2 illustrates the three dimensional image of FIG. 1 without the photographic overlay.

Turning now to FIGS. 1 and 2, a typical DSI® data file 10 captured from a live subject. FIG. 1 shows an operator viewed image 100 of data file 10 with a photographic overlay, and FIG. 2 illustrates a viewed image 1000 of data file 10 without photographic overlay. For a variety of reasons, the orientations of data files 10 and the corresponding images 100, 1000 vary significantly from subject to subject. Also, as is apparent from FIGS. 1 and 2, the captured image data includes not only the head 101, but the chest 103 of the subject and if the subject is held in position, the hands 105 of the holder of the subject.

Figure 3:
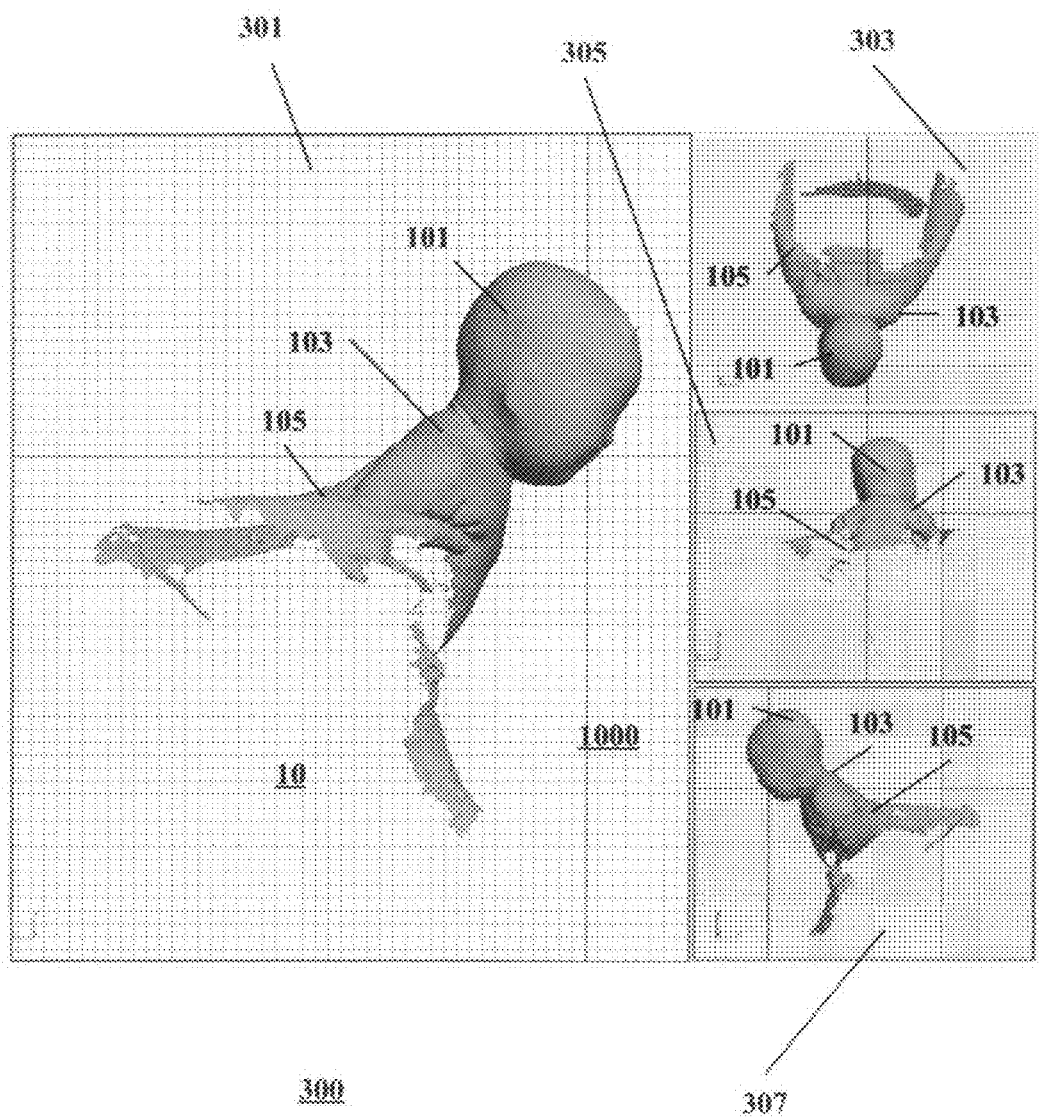
FIG. 3 illustrates different views of the three dimensional image of FIG. 2.

Turning to FIG. 3, a typical screen-shot displaying different views of a data file 10 is shown. Screen-shot 300 includes a right side view 301, top view 303, rear view 305 and left side view 307.

Captured DSI® data for different subjects are not aligned with each other. Accordingly captured DSI® data for a plurality of subjects cannot simply be averaged together. The captured DSI® data for different subjects must be properly scaled and oriented before averaging can be effective.

One method for registering images and digital records of anthropological artifacts is known as the "Procrustes method". It applies where a group of similar but individually unique items needs to be consistently described or processed. The Procrustes method as it is referred to in the scientific literature is simply resizing and alignment of each element in the database to match the orientation and size of the average element of the database. The fundamental difficulty encountered is that the average element of the database is not known before the alignment process begins.

In an embodiment of the invention, a "Procrustes" type of registering of data files in a database is provided.

Figure 4:
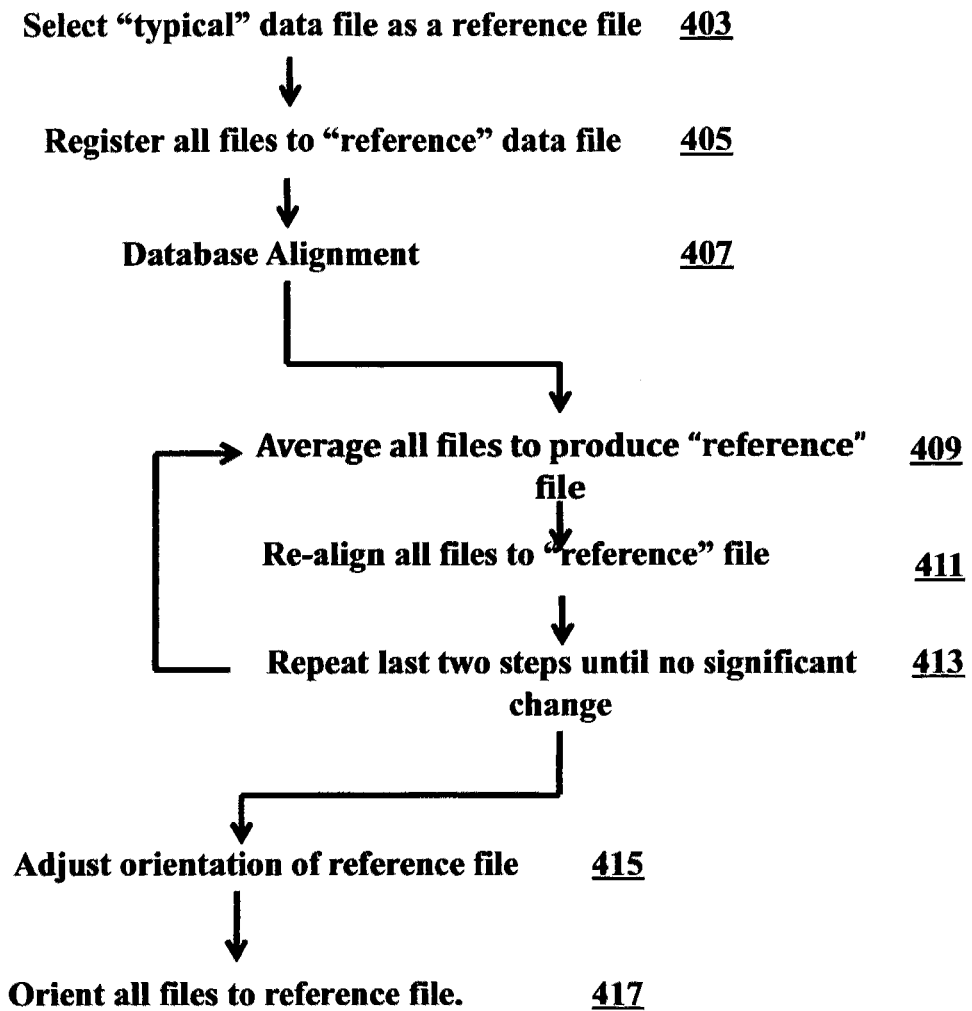
FIG. 4 illustrates steps utilized in one embodiment.

As shown in FIG. 4, database alignment shown at step 407 is preceded by first selecting as a reference mesh, a "typical" or "reference" subject DSI® data file 403 from the database and registering all of the other DSI® data file to the "reference" file at step 405.

Registration occurs by changing the seven parameters on the DSI® data mesh until a metric measuring the alignment of the two meshes is optimized. Registration optimization is obtained in two separate steps: a coarse registration followed by a fine registration. The coarse registration employs a robust metric and brings the two objects close enough together so that the sensitive metric employed by the fine registration can succeed to produce a more exact result. After this initial alignment is performed, all DSI® data files in the database become more closely aligned.

To simplify the math the six orientation parameters of a reference mesh are all set to zero. As a consequence, only the six parameters for the DSI® mesh are needed to align the two meshes. Adding a single magnification or scale parameter then brings the total number of parameters to seven. Magnification of the Reference is taken as 1.0. Orientation of DSI® data meshes to the reference mesh is accomplished by specifying six parameters: one translation (distance from the origin) for each of the three coordinate axes and one rotation around each coordinate axis. Aligning two DSI® meshes requires specifying the six parameters for each DSI® mesh so that the two DSI® meshes will be in the same spatial location and orientation.

Database alignment 407 is then performed by first averaging the more closely aligned files at step 409 to produce a new reference file. Each DSI® data file is then re-aligned to the new reference file at step 413. The result is that all the files are brought into even better alignment because the new average was more typical than the original DSI® reference. This averaging and re-alignment processing steps 409, 411 are repeated the reference DSI® data file produced does not change significantly with repeated processing.

Final orientation of DSI® data meshes is achieved after automated alignment and cutoff of each new DSI® data mesh as described below. An alignment algorithm registers each new DSI® data mesh to the database reference independent of the orientation of the reference. By adjusting the orientation of the reference, each new DSI® data mesh is automatically oriented as well as registered. The final orientation can be adjusted at any time.

Although human vision systems easily recognize general similarities between objects, mathematical registration does not. We developed an approach to automatically provide registration.

In the following description of registration of two meshes, the first of the two meshes is referred to as the "library" or "reference" mesh and the second mesh is referred to as the DSI® mesh.

In a first embodiment of the invention, a system and method are provided that operate on a three-dimensional digital image of a subject that is in a predetermined format. The system and method automatically crop and orientate the digital image to be consistent with a library reference. Four crops of the digital mesh are automatically provided to yield a digital mesh that is stored in a database and that is used for further processing.

In an alternate embodiment of the invention, at least some of the crops and orientating are provided with operator control and/or intervention.

The methodology utilized various embodiments is first summarized below with respect to the method steps of FIG. 5 and a representative vertex point cloud 600 for the subject of FIGS. 1 and 2 shown in FIG. 6.

In an initial step 501, extraneous information, i.e., stray polygons and vertices, is removed. Removal of unattached vertices and other mesh elements is achieved using a commercially available software function on an adjacency matrix defined by the DSI® mesh. This operation leaves intact only the largest "connected" section of the mesh.

Figure 6:
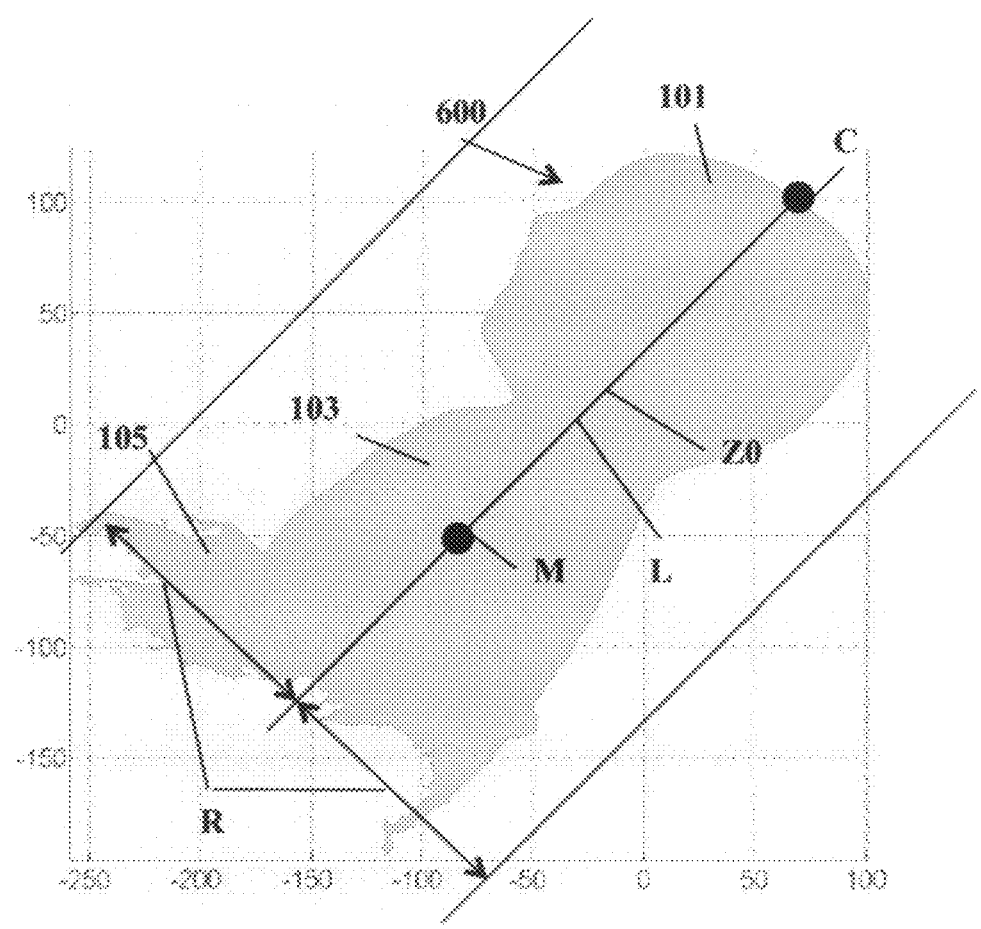
FIG. 6 illustrates a vertex cloud for determination of a reference axis for an image of FIG. 1.

After removal of the extraneous information, two points are selected for the vertex point cloud 600 of the subject at step 503 as shown in FIG. 6. The median M of vertex point cloud 600 is determined. The median M of vertex point cloud 600 is independent of the orientation of cloud 600. For the DSI® captured data files, the median M is almost always approximately in the center of the chest cavity.

The furthest point C away from the median but lying such that both its z-axis coordinate and y-axis coordinate are positive is identified. Point C is on the upper cranium.

The line L joining the median M and this furthest point C is taken to be a new z-axis Z0 at step 505. The other axes, i.e., x-axis and y-axis, are computed easily since they are orthogonal to z-axis Z0.

Once axis Z0 is identified, a first crop is performed at step 507 to remove all portions of the image that are more than a first predetermined radial distance R away from axis Z0. The radial distance selected in the illustrative embodiment is selected to be 150 cm.

Figure 7:
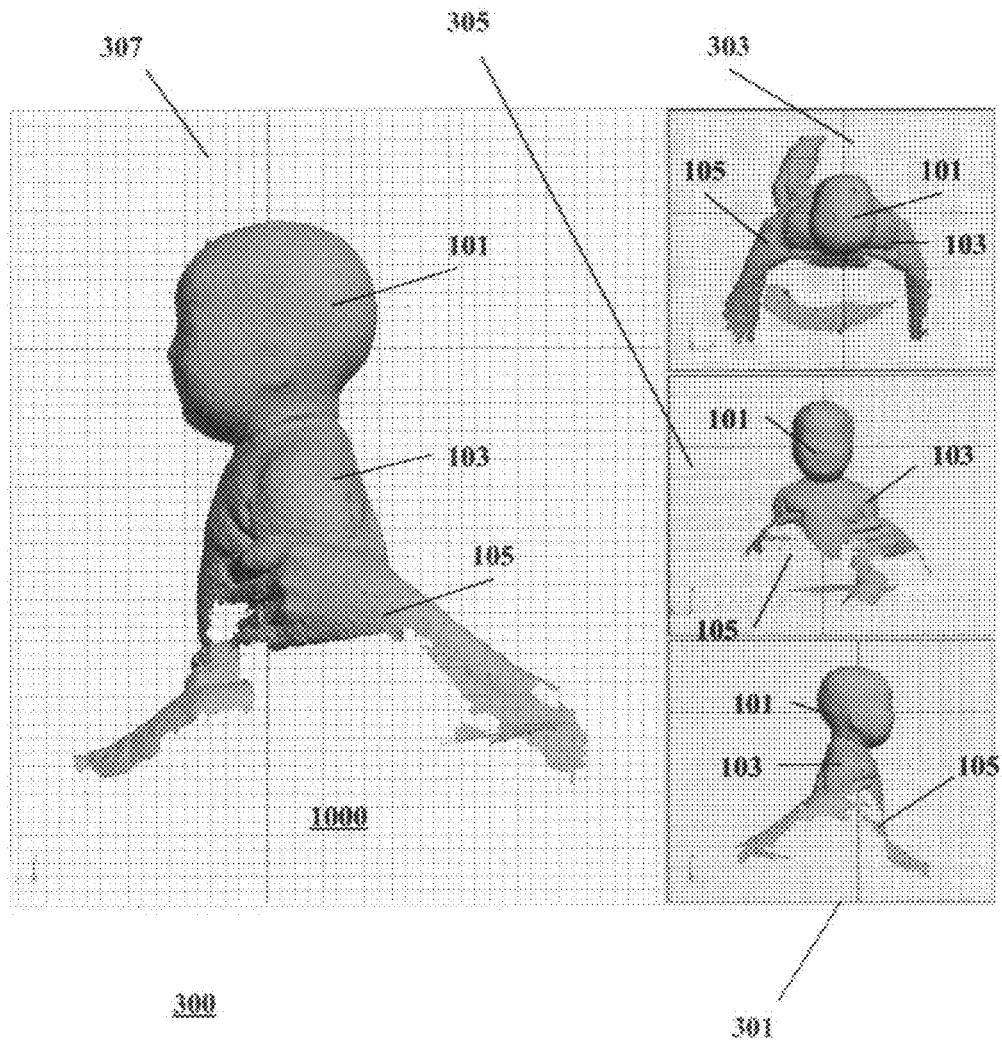
FIG. 7 illustrates the views of FIG. 3 with the image reoriented to a reference axis.

Axis Z0 is utilized to orient image 100 consistent with the reference. The reorientation produces the reoriented images as shown in FIG. 7.

Figure 5:
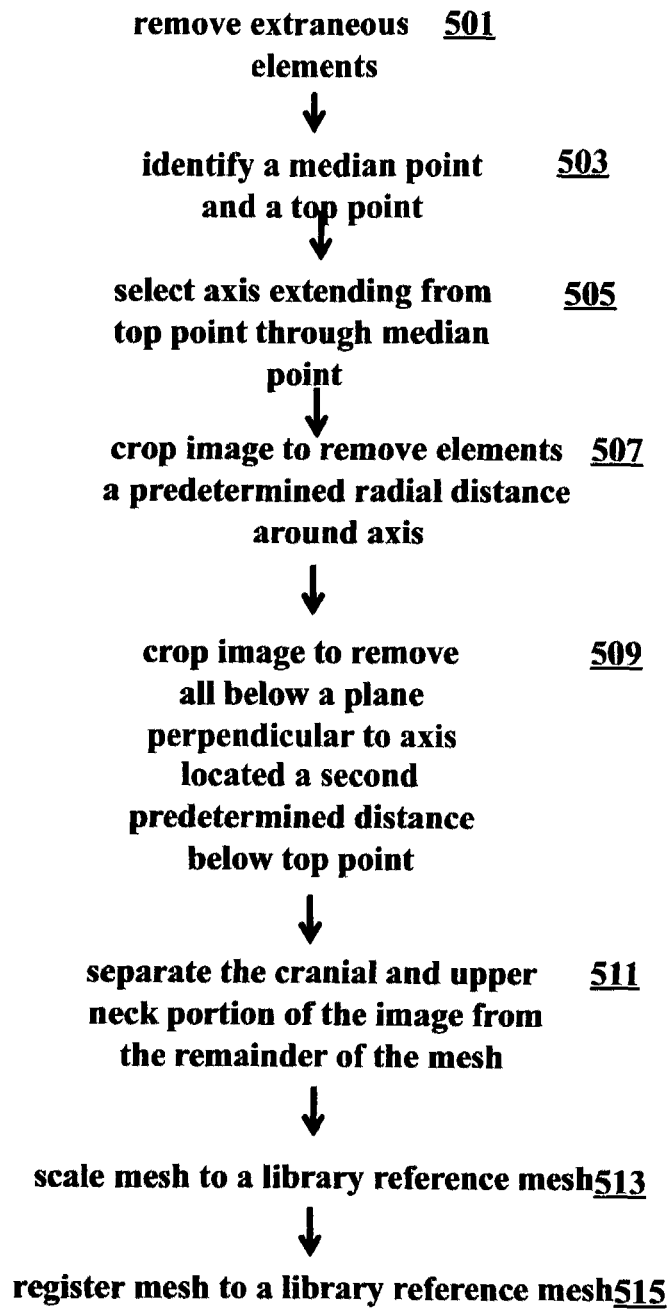
FIG. 5 illustrates further steps utilized in an embodiment.
Figure 8:
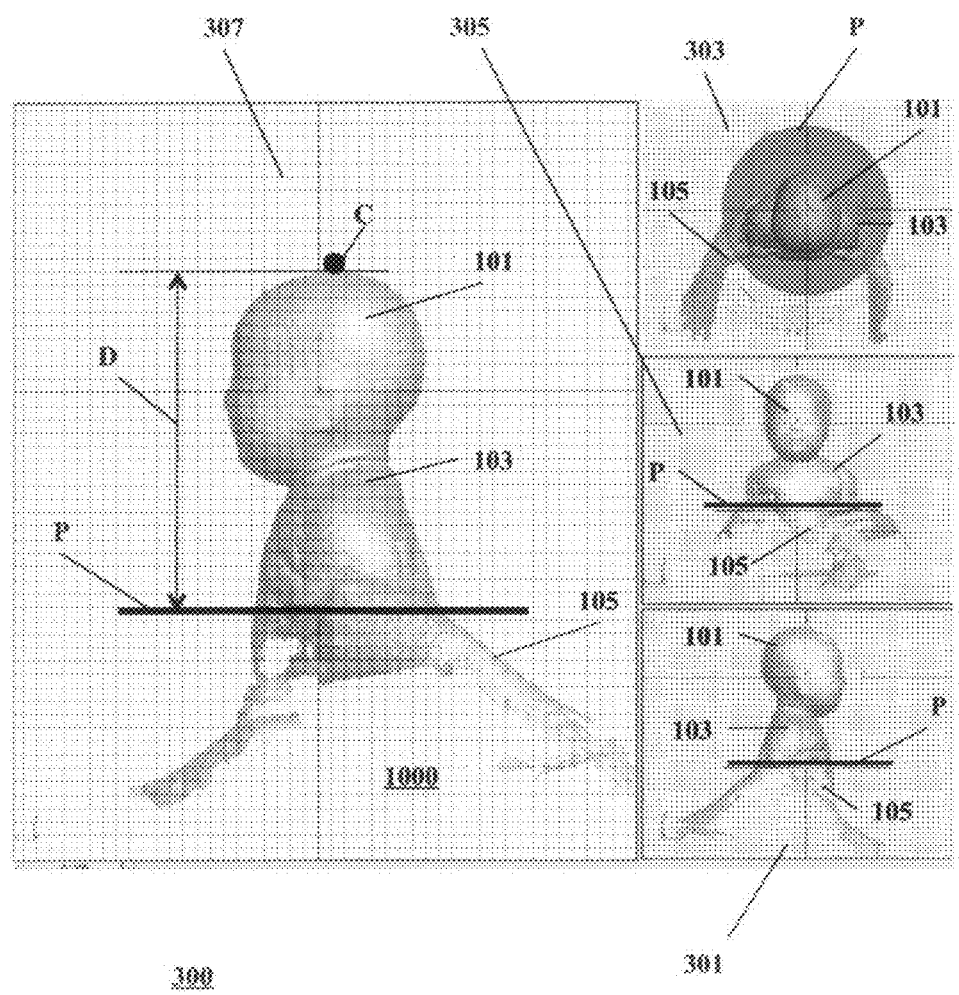
FIG. 8 illustrates the location of a cropping plane on the views of FIG. 7.

A second crop is performed at step 509 as shown in FIG. 5. A plane P is selected at a second predetermined distance from the second point C as shown in FIG. 8. Plane P is selected to be perpendicular to axis Z0. All portions of the DSI® data mesh 1000 that lie below plane P are cropped out or removed.

Figure 9:
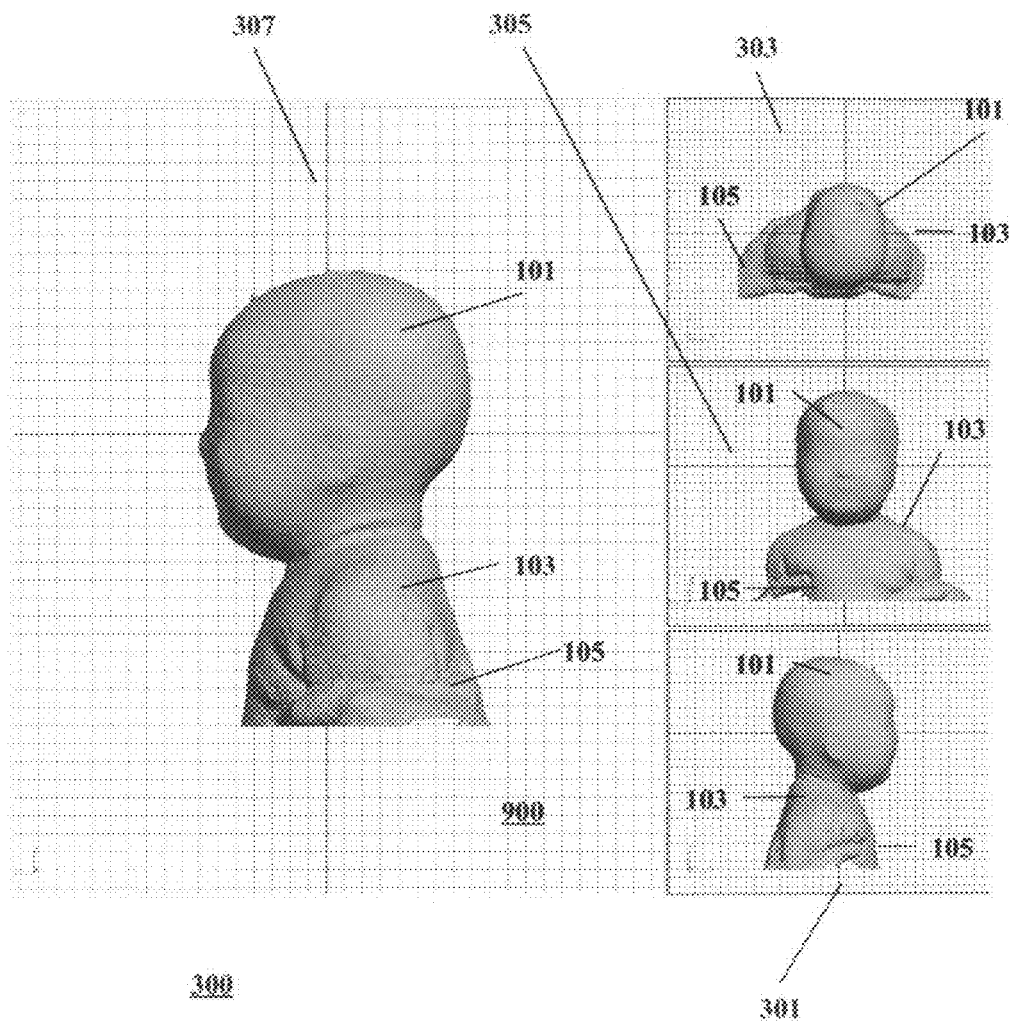
FIG. 9 illustrates the images of FIG. 8 after a first crop.

The resulting data mesh 900 shown in FIG. 9 comprises the cranium 101 and the upper chest portion 103, 105 of the subject DSI® data mesh 1000. This final "cranial mesh" 900 contains fewer vertices and fewer triangles than the original DSI® mesh.

Turning back to FIG. 5, at step 511 the cranial and upper neck portion of the DSI® data mesh is separated from the remainder of the mesh. A predetermined algorithm is utilized to separate the cranial and upper neck portion of the image from the remainder of the mesh. The predetermined algorithm utilized in the embodiment of the invention is a mixture of Gaussians (MOG) algorithm.

The remaining mesh containing primarily the chest and cranial regions, is analyzed using MOG to identify each vertex as lying in one of two classes. One class normally contains only the upper neck and cranial region, the other class has the rest of the chest mesh. This neck/cranial region is entered into a coarse registration. After using a "Procrustes" function on the geodesically determined vertices, all further registrations are based on predetermined points selected in the cranial region of the "chest mesh". Using the chest mesh in later registration rounds allows more of the neck region to enter the registration if needed, but using only the cranial region for the initial 512 vertices better concentrates those and all later selections within the cranium.

Figure 10:
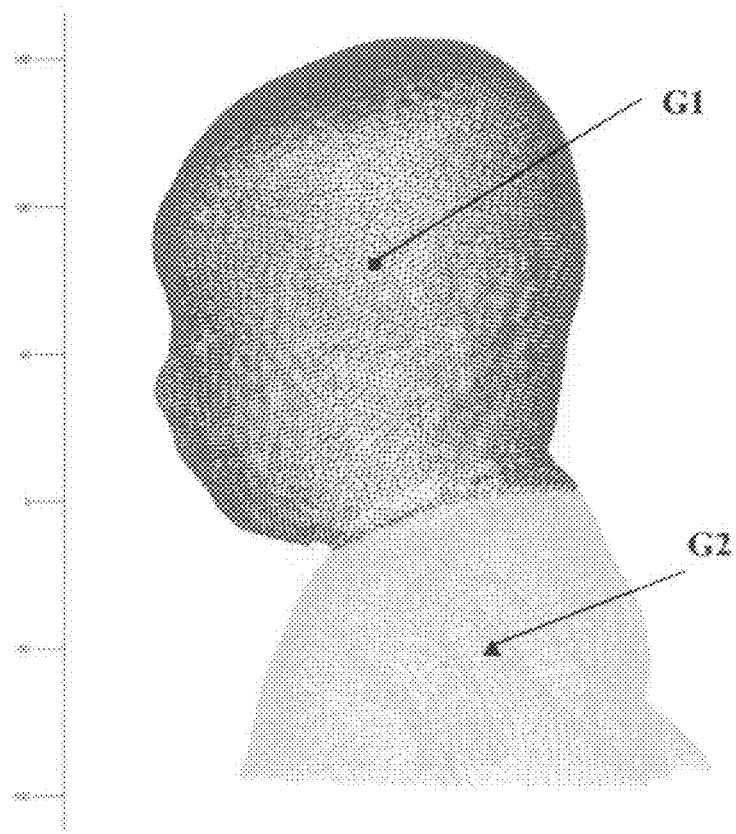
FIGS. 10 and 11 illustrate the location of Gaussian weighted centers of the head and chest portions of the images of FIG. 9.
Figure 11:
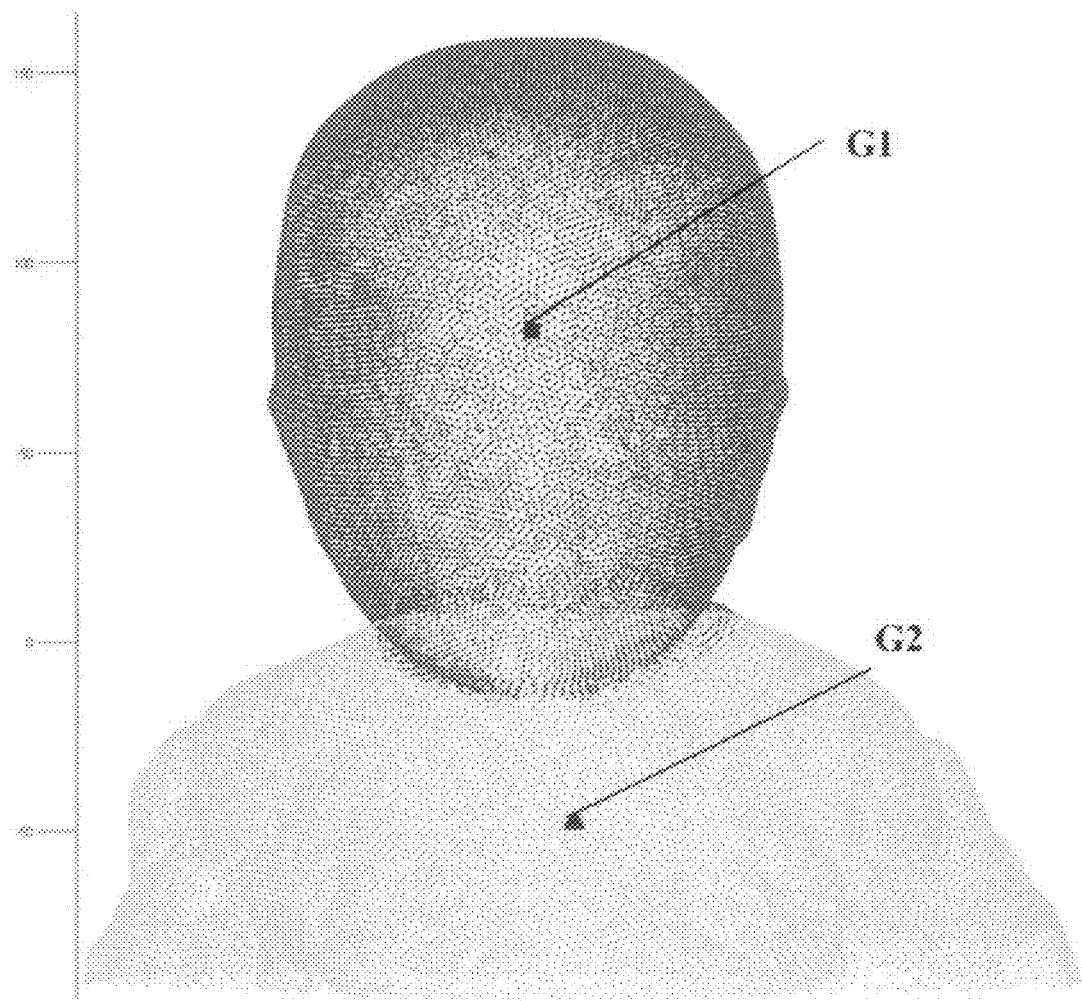
Figure 12:
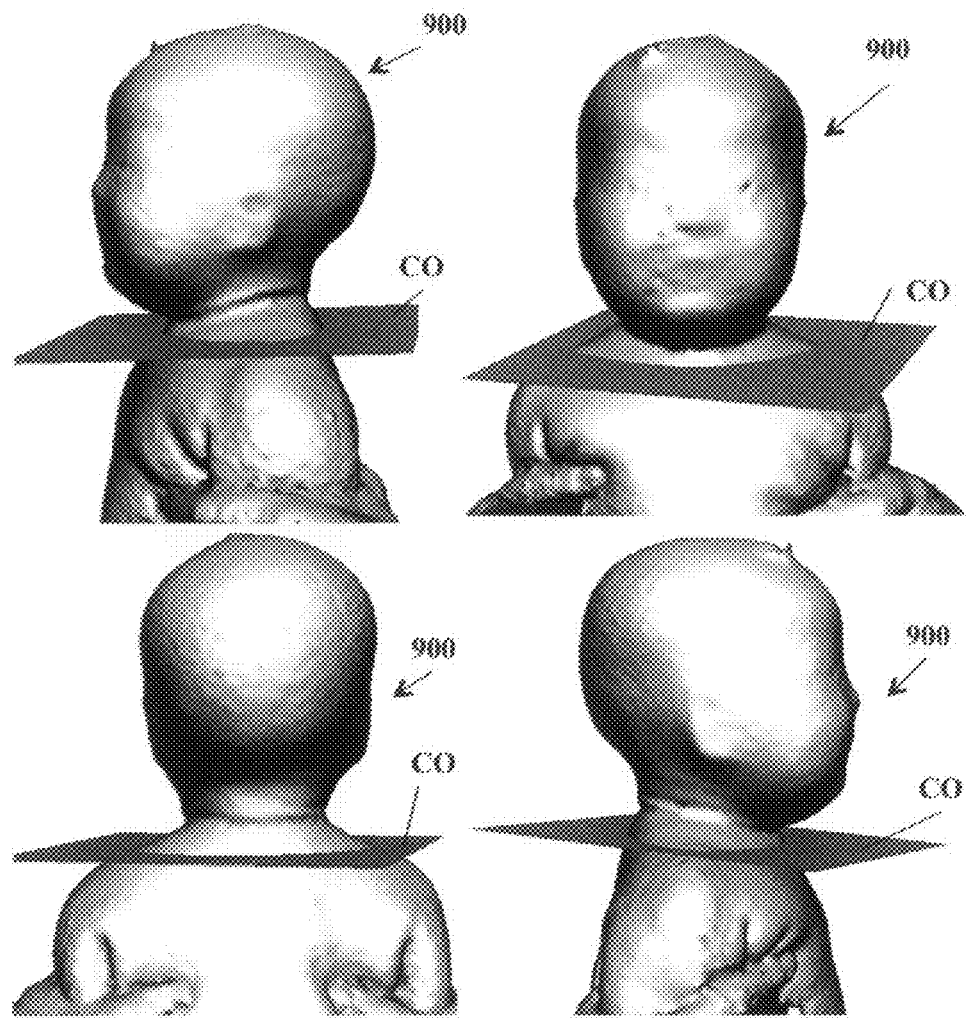
FIG. 12 illustrates the position of a second cropping plane.

FIGS. 10 and 11 illustrate the locations of a calculated MOG cranium center G1 and a calculated chest MOG point G2. Utilizing MOG points G1, G2, a crop plane C0 is determined as shown in FIG. 12.

Figure 13:
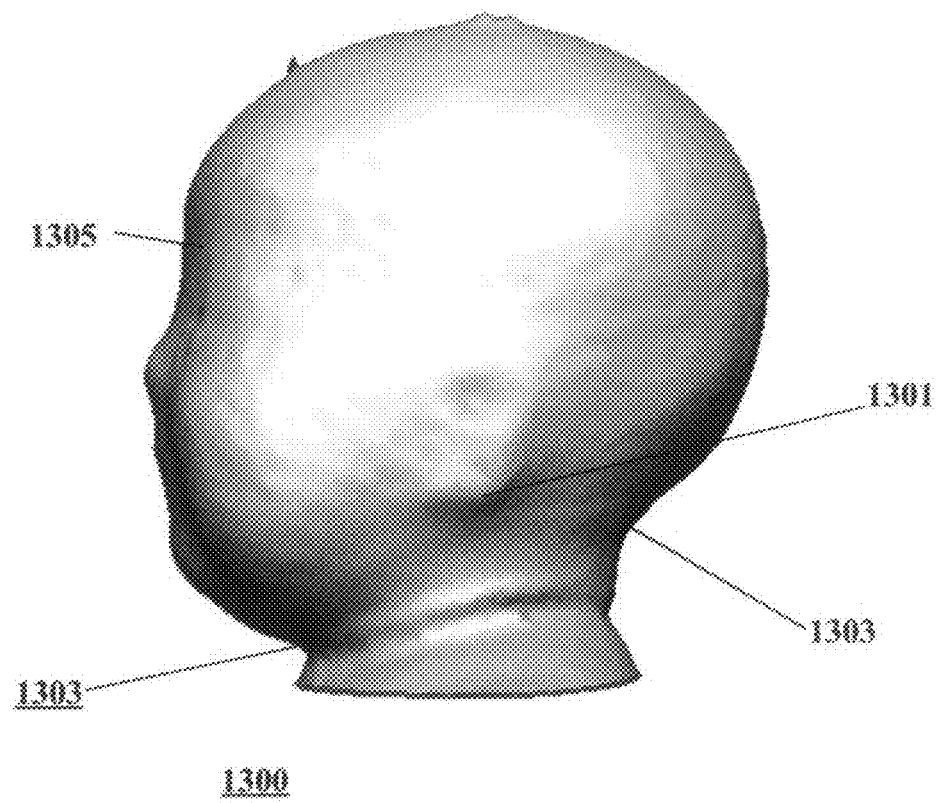
FIG. 13 illustrates a view of the three-dimensional image after a second cropping.

DSI® data mesh 900 is cropped to remove the mesh portion lying below crop plane C0 producing the DSI® data mesh 1300 shown in FIG. 13.

Turning back to FIG. 5, the resulting DSI® data mesh image 1300 is then scaled to a library reference mesh based upon the shape of the cranium utilizing Frobenius metrics to determine a scale factor to the library reference mesh as indicated at step 513.

Following scaling, the resulting DSI® data cranial mesh is registered at step 515 to the library reference mesh utilizing a two-step translational registration using least squares followed by mutual information. The resulting DSI® data cranial mesh 1300 is stored in a database for further processing.

In a second embodiment of the invention, the cranial mesh is further operated on to identify those portions of the mesh 1300 that are of particular interest for further processing.

In the second embodiment, further cropping of the image mesh is provided.

In the particular application of the system and method of the invention, the portion of the subject below the bottom of the ear lobes is not of relevance.

In particular, portions of the DSI® data cranial mesh that are not necessary for further processing are cropped off the image mesh.

Figure 14:
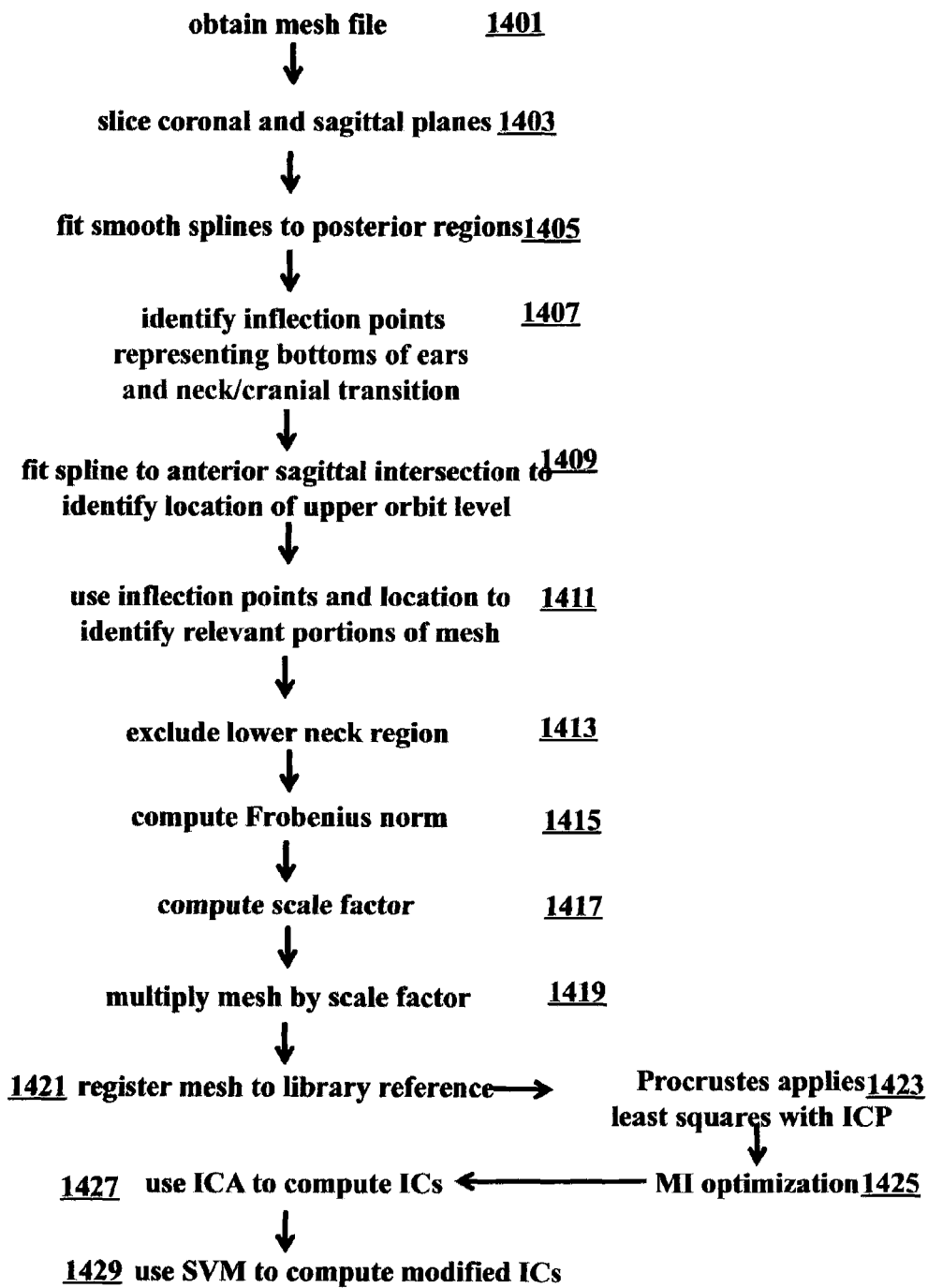
FIG. 14 illustrates a further methodology steps.

Turning now to FIG. 14, the additional steps that are utilized in the embodiment of the invention are described.

At step 1401 the DSI® data cranial mesh 1300 is obtained from the database.

Key inflection points are identified on the mesh image to locate the orbits of the subject and to identify the bottoms of the ears of the subject. Key inflection points in the embodiment are determined by first slicing the DSI® data cranial mesh through coronal and sagittal planes as indicated at step 1403. Smooth splines are fit to posterior regions at step 1405. Inflection points are identified representing the bottoms of the ears 1301 and the neck/cranial transitions 1303 at step 1407.

A spline is fit to the anterior sagittal intersection of the planes to identify the location of the upper orbit level 1305 at step 1409.

After key inflection points 1301, 1303, 1305 are identified, the inflection points are utilized to identify relevant portions of the DSI® data cranial mesh 1300 at step 1411.

Figure 15:
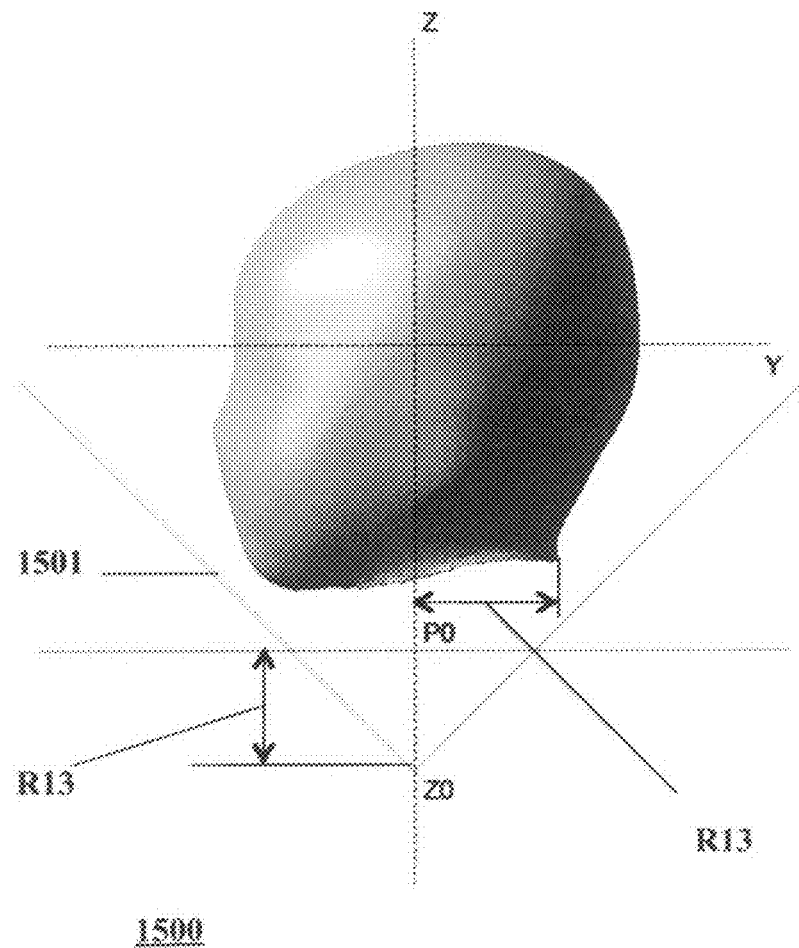
FIG. 15 a cropping configuration.

The identification of the bottoms of the ears is utilized to identify a further crop plane that is used to exclude that portion of the DSI® data cranial mesh below the plane to exclude or crop off the lower neck region from DSI® data cranial mesh at step 1413 to produce the digital mesh 1500 shown in FIG. 15.

Subsequent to cropping the DSI® data cranial mesh 1300, Frobenius scaling is again applied to produce a cranial mesh. Frobenius scaling is accomplished by computing a Frobenius norm at step 1415 and then computing a scale factor at step 1417. The DSI® data cranial mesh is then multiplied by the scale factor at step 1419.

After the Frobenius scaling, the cranial mesh is registered to the reference mesh at step 1421 by utilizing translational registration using least squares. A "Procrustes" function is used to apply least squares with iterative closest points computed by normal shooting, i.e., bed of nails, at step 1423. The Procrustes function step is followed by mutual information (MI) with pattern search optimization at step 1425. All rotational degrees of freedom remain unchanged, only the translational degrees are optimized.

After isolating cranium mesh CM and defining a new z-axis Z0, additional coarse registration is performed using an Iterative Closest Points (ICP) algorithm. The ICP algorithm operates by selecting a set of points on the reference and locating the closest set of matching points on the cranial mesh. A set of transformations is applied and the registration quality metric is computed for each of the transformations. Once the optimal transformation according to the metric is identified and applied to the cranial mesh, the matching of cranial mesh points to those on the reference is repeated. Because the cranial mesh location has been transformed, the new matching set is different than the previous matched set and so the transformation optimization is again optimized and the closest matching set of points identified. These iterations continue until the transformations are acceptably small.

Figure 16:
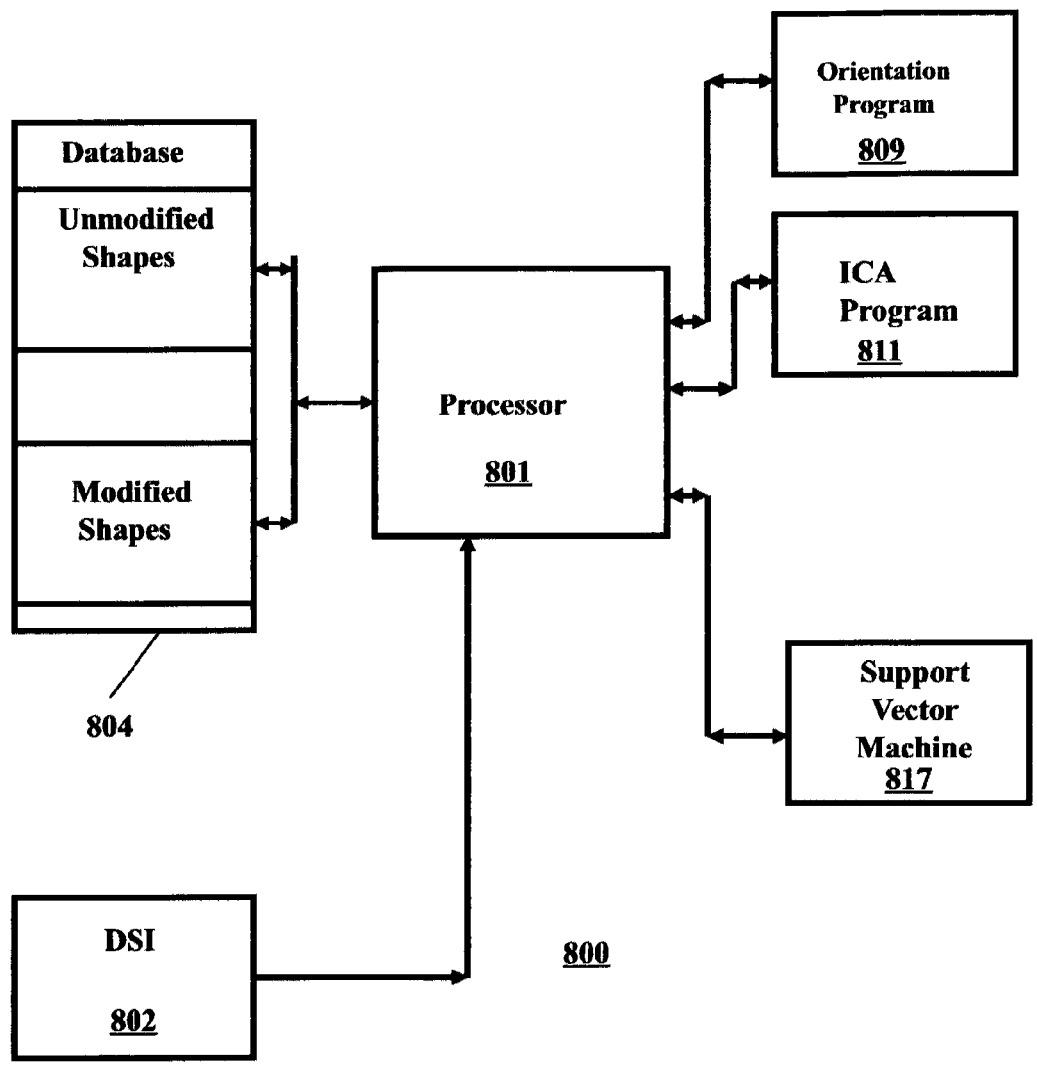
FIG. 16 is block diagram of a system.

Turning now to FIG. 16, system 800 utilizes the methodologies described above. System 800 comprises a computer or processor 801 that processes DSI® files received from DSI® system 802. A plurality of DSI® files are stored in database 804. The database 804 files are used to train a Support Vector Machine (SVM) 817. Support Vector Machine 817 is an application that processes each DSI® file to output a properly oriented and "modified" stereo lithography (STL) standard file replicating a modified shape that would have previously been produced by a trained expert.

STL is a file format native to stereo lithography CAD software that is commercially available. STL files describe only the surface geometry of a three dimensional object without any representation of color, texture or other common CAD model attributes. An STL file describes a raw unstructured triangulated surface by the unit normal and vertices of the triangles using a three-dimensional Cartesian coordinate system System 800 automatically processes digital image representations representative of a subject head shape. System 800 comprises a database library 804 of a first plurality of first digital image representations of subject head shapes captured directly from live subjects, and a second plurality of second digital image representations of corresponding modified head shapes. System 800 includes processor 801 that further comprises a support vector machine application 817. Database library 804 is used to provide the plurality of said first and second digital image representation to processor 801 to train support vector machine 817 to operate on new digital image representations.

System 800 receives a new digital image representation file or DSI® mesh of a subject head shape from DSI® system 802. Support vector machine 817 operates on the DSI® mesh to generate a corresponding new second digital image representation replicating a corresponding modified head shape and stores each new digital image representation file and the corresponding new second digital image representation file in database 804.

In accordance with the methodology described hereinabove, processor 801 operates on a raw file received from DSI® 802. Processor 801 removes all vertices, polygons, or other mesh elements that are not attached to the subject. Processor 801 analyzes the resulting point cloud of the retained mesh using k-means. This provides two "centers", one for the vertices labeled to be in the upper mesh and the other for vertices labeled to be in the lower mesh. A line joining the upper and lower centers defines an initial vertical z-axis for the patient. A patient y-axis is computed as the cross product of this patient z-axis with the original x-axis provided by the digitizer. A new patient x-axis is finally computed as the cross product of the patient y-axis and z-axis. The mesh is rotated into this initial "patient coordinate system". In the patient coordinate system a "chest cutoff" is applied to produce the "chest mesh". For this, mesh elements less than 250 mm from the highest point of the mesh and lying within 150 mm of the z-axis are retained. A mixture of Gaussians (MOG) algorithm is then applied to separate the cranial and upper neck region from the rest of the chest mesh.

The median of the remaining cranial mesh is subtracted from each vertex in order to center at a new origin of coordinates. This median is computed using an area-weighted statistical sampling of the mesh. This sampled median approach overcomes non-uniformly spaced vertices produced.

Processor 801 then operates on each new digital image representation or DSI® mesh to orient said new digital image representation consistent with the digital image representations or DSI® mesh information stored in database 804. After orienting, processor 801 cuts or crops the DSI® mesh to obtain a corresponding cranial mesh.

After obtaining a corresponding cranial mesh, system 800 processes the cranial mesh to generate a new digital image representation or modified mesh representative of a desired head shape.

System 800 updates database 804 by storing each new first digital image representation or DSI® mesh in the database library 804 with the first plurality of first digital image representations and storing each corresponding new second digital image representation.

System 800 utilizes the updated database 804 to retrain support vector machine 817.

Independent Component Analysis (ICA) application program 811 initiates an ICP algorithm by selecting predetermined number vertices geodesically spaced on the reference model and then mathematically projected onto a unit sphere, i.e., a sphere centered at zero and having a radius of 1.0. Vertices from the cranial mesh are also projected onto the unit sphere and those lying closest to the set of the predetermined number of vertices projected from the reference model were selected to initiate the ICP algorithm.

The metric used to assess registration quality is sensitive enough to distinguish between small movements, but robust enough to achieve good results with the large variety of shapes presented by the raw cranial meshes.

After all subject files in database 804 are registered to the reference mesh, the average of the cranial meshes is taken to generate an updated reference mesh and continue the Procrustes averaging Turning back to FIG. 14, shapes computed by ICA are applied to the DSI® data cranial mesh at step 1427. A predetermined set of 128 independent components, IC, was found to allow very satisfactory representation.

The cranial mesh represented using ICA shapes is applied to a support vector machine (SVM) 817. SVM 817 uses the cranial mesh IC's as input and computes modified IC's as its outputs at step 1429.

The modified IC's define a cranial mesh for a modified head shape. The cranial mesh for the modified head shape is utilized to fabricate a cranial device.

To prepare for the first rounds of Iterated Closest Points (ICP) two preliminary steps are performed. A search tree for the cranial mesh is built and a "unit sphere matching" is performed. The search tree speeds the process of identifying which points in the cranial mesh lie closest to those in the reference mesh set. Given the index of a point or set of points in the reference mesh set, ICP requires identifying the index of the closest point in the cranial mesh. This tree simply speeds the searches for the closest points. The "unit sphere matching" is done to initiate the ICP.

Each vertex of the re-centered DSI® mesh is projected onto the unit sphere by dividing the vertex vector by its own magnitude. A set of 512 vertices is established on the reference mesh. That set of vertices is geodesically spaced on the reference mesh and their indices are stored in database 804. Projecting them onto the same unit sphere as the re-centered cranial mesh allows identifying the set of cranial mesh vertices that are closest to the geodesic set from the reference mesh. This matched set and the search tree are used to do a predetermined number of rounds of ICP using a "Procrustes" function.

Fine registration differs from the coarse registration in three significant ways. First, the reference mesh is treated as a surface rather than just a collection of geodesically spaced vertices. Second, the set of vertices used in the cranial mesh do not change; they are the ones from the final match achieved in the coarse registration. The third difference is that only MI optimization is done, no preliminary ICP is applied.

Processor 801 averages all of the cranial meshes together to establish a reference mesh.

Once Processor 801 aligns all of the cases in database 804, processor 801 computes the trimmed mean of each vertex. The trimmed mean throws away the most extreme 30 percent of the cases at each vertex and computes a uniformly weighted average of the remaining cases.

Processor 801 applies averaging separately to the x, y, and z coordinates to generate a "right side" flattened average mesh. The right side mesh is then mathematically mirrored about its x-axis and averaged with itself to create a symmetric reference mesh.

Processor 801 uses the symmetric reference mesh to compute other information stored in database 804 to define the coordinate system for a "cone" used in a final cropping. This crop is achieved using a truncated and inverted cone 1501 as shown in FIG. 15. The axis z of the cone 1501 is aligned with the vertical axis and its wall is at 45 degrees from the vertical. The mesh elements lying above a horizontal plane P0 disposed orthogonal to cone axis Z and the inside inverted cone 1501 are retained as the final mesh; those outside of that region are discarded.

The method and system of the invention provide orientation independence of the subject. Orientation independence refers to achieving the foreground/background separation with no requirements on how the subject is oriented. It includes effective methods to ignore the irrelevant limbs, stools, and even pacifiers.

The invention has been described in terms of illustrative embodiments. It will be apparent to those skilled in the art that various changes and modifications can be made to the illustrative embodiments without departing from the spirit or scope of the invention. It is intended that the invention include all such changes and modifications. It is also intended that the invention not be limited to the illustrative embodiments shown and described. It is intended that the invention be limited only by the claims appended hereto.

What is claimed is:

1. A method for processing a three-dimensional digital image representation representative of a subject head shape having cranial deformities to generate a corresponding three-dimensional digital representation of a corresponding non-deformed modified head shape, comprising:

providing a database library of a first plurality of first three-dimensional digital image representations of subject head shapes having cranial deformities captured directly from corresponding subjects, and a second plurality of second three-dimensional digital image representations of corresponding modified head shapes, each of said second three-dimensional digital image representations corresponding to one of said first three-dimensional digital image representations, each modified head shape corresponding to said subject head shape corrected for cranial deformities;

providing a support vector machine;

utilizing said database library plurality of said first and second three-dimensional digital image representations to train said support vector machine to operate on new three-dimensional digital image representations captured directly from new subjects and to compute for each new three-dimensional digital image representation a corresponding second three-dimensional digital representation of a corresponding modified head shape;

receiving a new three-dimensional digital image representation of a head having cranial deformities captured from a new subject;

operating said support vector machine such that said support vector machine operates on said new first three-dimensional digital image representation to generate a corresponding new three-dimensional second digital image representation of a modified head shape corresponding to said new first three-dimensional digital image representation and correcting for said cranial deformities.

2. A method in accordance with claim 1, comprising:
updating said database library to produce an updated database library by
    storing each said new first three-dimensional digital image representation in said database library with said first plurality of first three-dimensional digital image representations; and
    storing each said new second three-dimensional digital image representation in said database library with said second plurality of second three-dimensional digital image representations.

3. A method in accordance with claim 2, comprising:
utilizing said updated database library to retrain said support vector machine.

4. A method in a accordance with claim 1, comprising:
operating on said new three-dimensional digital image representation to remove extraneous image data.

5. A method in accordance with claim 4, comprising:
operating on said new three-dimensional digital image representation to orient said new three-dimensional digital image representation consistent with said first three-dimensional digital image representations.

6. A method in accordance with claim 5, comprising:
cropping said new three-dimensional digital image representation.

7. A method for processing a three-dimensional digital image representation representative of a subject head shape having cranial deformities, comprising:
    providing a database library of a first plurality of first three-dimensional digital image representations of subject head shapes having cranial deformities captured directly from corresponding subjects, and a second plurality of second three-dimensional digital image representations of corresponding modified head shapes, each of said second three-dimensional digital image representations corresponding to one of said first three-dimensional digital image representations;
    providing a support vector machine;
    utilizing said database library plurality of said first and second three-dimensional digital image representation to train said support vector machine to operate on new three-dimensional digital image representations of new subject head shapes each having cranial deformities, such that said support vector machine calculates new second three-dimensional digital image representations of modified head shapes each corresponding to one of said first three-dimensional digital image representations and correcting said cranial deformities;
    receiving a new three-dimensional digital image representation of a head shape having cranial deformity captured from a new subject;
    operating on said new three-dimensional digital image representation to remove extraneous image data;
    operating on said new three-dimensional digital image representation to orient said new three-dimensional digital image representation consistent with said first three-dimensional digital image representations;
    cropping said new three-dimensional digital image representation;
    updating said database library to produce an updated database library by storing each said new first three-dimensional digital image representation, after removal of extraneous data, orienting, and cropping, in said database library with said first plurality of first three-dimensional digital image representations.

8. A method in accordance with claim 7, comprising:
operating said support vector machine such that said support vector machine operates on said new three-dimensional first digital image representation, after removal of extraneous data, orienting, and cropping, to generate a corresponding new second three-dimensional digital image representation of a modified head shape corresponding to said new first three-dimensional digital image representation and correcting for said cranial deformity.

9. A method in accordance with claim 8, comprising:
updating said database library to produce an updated database library by storing each said new second three-dimensional digital image representation in said database library with said second plurality of second three-dimensional digital image representations.

10. A method in accordance with claim 7, comprising:
selecting a data format for each of said first and second three-dimensional digital image representations that describes only the surface geometry of the corresponding said deformed head shape or said modified head shape.

11. A method in accordance with claim 10, comprising:
utilizing said updated database library plurality of said first and second three-dimensional digital image representation to retrain said support vector machine to operate on further new three-dimensional digital image representations of head shapes having cranial deformities.

12. A system for processing three-dimensional digital image representations representative of a subject head shape having a cranial deformity to generate a corresponding three-dimensional digital representation of a corresponding modified head shape correcting said cranial deformity, comprising:
    a database library of a first plurality of first three-dimensional digital image representations of subject head shapes having cranial deformities captured directly from corresponding subjects, and a second plurality of second three-dimensional digital image representations of corresponding modified head shapes, each of said second digital image representations corresponding to one of said first digital image representations with said cranial deformities corrected;
    a support vector machine;
    said support vector machine being trained with said database library first plurality of said first three-dimensional digital image representations and said second plurality of second three-dimensional digital image representations;
    a new first three-dimensional digital image representation of a new subject head shape captured directly from a new subject, said new subject head shape comprising cranial deformity;
    said support vector machine operating on said new first three-dimensional digital image representation to generate a corresponding new second three-dimensional digital image representation, said new second three-dimensional digital representation replicating a new corresponding modified head shape, corresponding to said new first three-dimensional digital image representation and correcting said new subject head shape cranial deformity.

13. A system in accordance with claim 12, comprising:
an updated database library comprising: said first plurality of first three-dimensional digital image representations of subject head shapes, said second plurality of second three-dimensional digital image representations of corresponding modified head shapes, said new first three-dimensional digital image representation, and each said new second three-dimensional digital image representation.

14. A system in accordance with claim 13, wherein:
said support vector machine is retrained utilizing said updated database library.

15. A system in accordance with claim 12, comprising:
a processor to operate on said new first three-dimensional digital image representation to remove extraneous image data.

16. A system in accordance with claim 15, comprising:
said processor operable to operate on said new first three-dimensional digital image representation to orient said new first three-dimensional digital image representation consistent with said first three-dimensional digital image representations.

17. A system in accordance with claim 16, comprising:
said processor operable to crop said new first three-dimensional digital image representation.

18. A system to process three-dimensional digital image representations representative of a subject head shape comprising cranial deformity, comprising:
a processor;
a database library of a first plurality of three-dimensional digital image representations of subject head shapes each comprising cranial deformity captured directly from corresponding subjects, and a second plurality of second three-dimensional digital image representations of corresponding modified head shapes, each of said second three-dimensional digital image representations corresponding to one of said subject head shapes with said cranial deformity corrected;
a support vector machine, said support vector machine trained by said first and second three-dimensional digital image representations to train said support vector machine to operate on a new three-dimensional digital image representation to generate a new second three-dimensional digital image representation for a corresponding modified head shape having said deformity corrected;
a new first three-dimensional digital image representation of a subject head shape captured directly from a new subject;
said processor operable on said new first three-dimensional digital image representation to remove extraneous image data;
said processor operable on said new first three-dimensional digital image representation to orient said new first three-dimensional digital image representation consistent with said first three-dimensional digital image representations; and
said processor operable to crop said new first three-dimensional digital image representation.

19. A system in accordance with claim 18, comprising:
said processor operable to update said database library to produce an updated database library such that said updated database library has stored therein said new first three-dimensional digital image representation.

20. A system in accordance with claim 18, comprising:
said support vector machine operable on said new first three-dimensional digital image representation to generate a corresponding new second three-dimensional digital image representation, said second three-dimensional digital representation corresponding to a modified head shape correcting said cranial deformity.

21. A system in accordance with claim 18, comprising:
said processor is operable to update said updated database library to produce an updated database library, such that said updated database library has stored therein said new second three-dimensional digital image representation.

22. A system in accordance with claim 21, comprising:
said support vector machine is retrained with said updated database library.

* * * * *